United States Patent [19]

Lowe et al.

[11] Patent Number: 5,538,085
[45] Date of Patent: Jul. 23, 1996

[54] GAUGE WHEEL MOUNTING

[75] Inventors: Terry L. Lowe, Ankeny; James T. Noonan, Johnston, both of Iowa

[73] Assignee: Deere & Company, Moline, Ill.

[21] Appl. No.: 423,620

[22] Filed: Apr. 17, 1995

[51] Int. Cl.$^6$ ............................. A01B 39/08; A01B 39/22
[52] U.S. Cl. .......................... 172/145; 172/427; 172/675
[58] Field of Search ................................ 172/145, 427, 172/425, 423, 395, 583, 668, 675, 744; 111/68, 926

[56] References Cited

U.S. PATENT DOCUMENTS

| | | | |
|---|---|---|---|
| 2,203,022 | 6/1940 | Kamplade | 172/427 X |
| 2,551,333 | 5/1951 | O'Brien | 172/744 |
| 3,403,737 | 10/1968 | Byrd | 172/427 X |
| 3,625,293 | 12/1971 | Nelson | 172/395 X |
| 3,935,906 | 2/1976 | Neal et al. | 172/744 X |
| 4,033,417 | 7/1977 | Rau et al. | 172/675 X |
| 4,423,788 | 1/1984 | Robinson, Jr. et al. | 172/427 |
| 4,494,883 | 1/1985 | Winter | 384/439 |
| 4,509,603 | 4/1985 | Adams | 172/427 |
| 4,560,011 | 12/1985 | Peterson et al. | 172/744 X |
| 4,819,737 | 4/1989 | Frase | 172/744 X |
| 5,361,848 | 11/1994 | Fleischer et al. | 172/145 X |

OTHER PUBLICATIONS

Deere & Company, brochure entitled "Cultivators and Hoes — Win Your War On Weeds The Low-Cost Way", 16 pages (see particularly the cover page, pp. 10–11, and back cover), dated Aug. 1994, published in the U.S.A.

*Primary Examiner*—Dave W. Arola
*Assistant Examiner*—Christopher J. Novosad

[57] ABSTRACT

A gauge wheel assembly includes a gauge wheel arm that straddles the rig tube and is supported on the tube by two bushings inserted through holes on either side of the tube. The bushings contact each other near the center of the tube to provide a solid or hard joint which permits the pivot bolt to be tightened without crushing the sides of the tube. The bushing has protrusions that are pressed into the tubing wall during installation and thereby prevent bushing rotation. Two different straps at the lower end of the wheel arm permits at least three different combinations of gauge wheels to be quickly and easily mounted. A compact and easily accessible depth adjusting crank is supported entirely above the rig tube. A depth indicator projects from the crank trunnion mounting on the upper end of the wheel arm to provide an indication of depth adjustment.

18 Claims, 3 Drawing Sheets

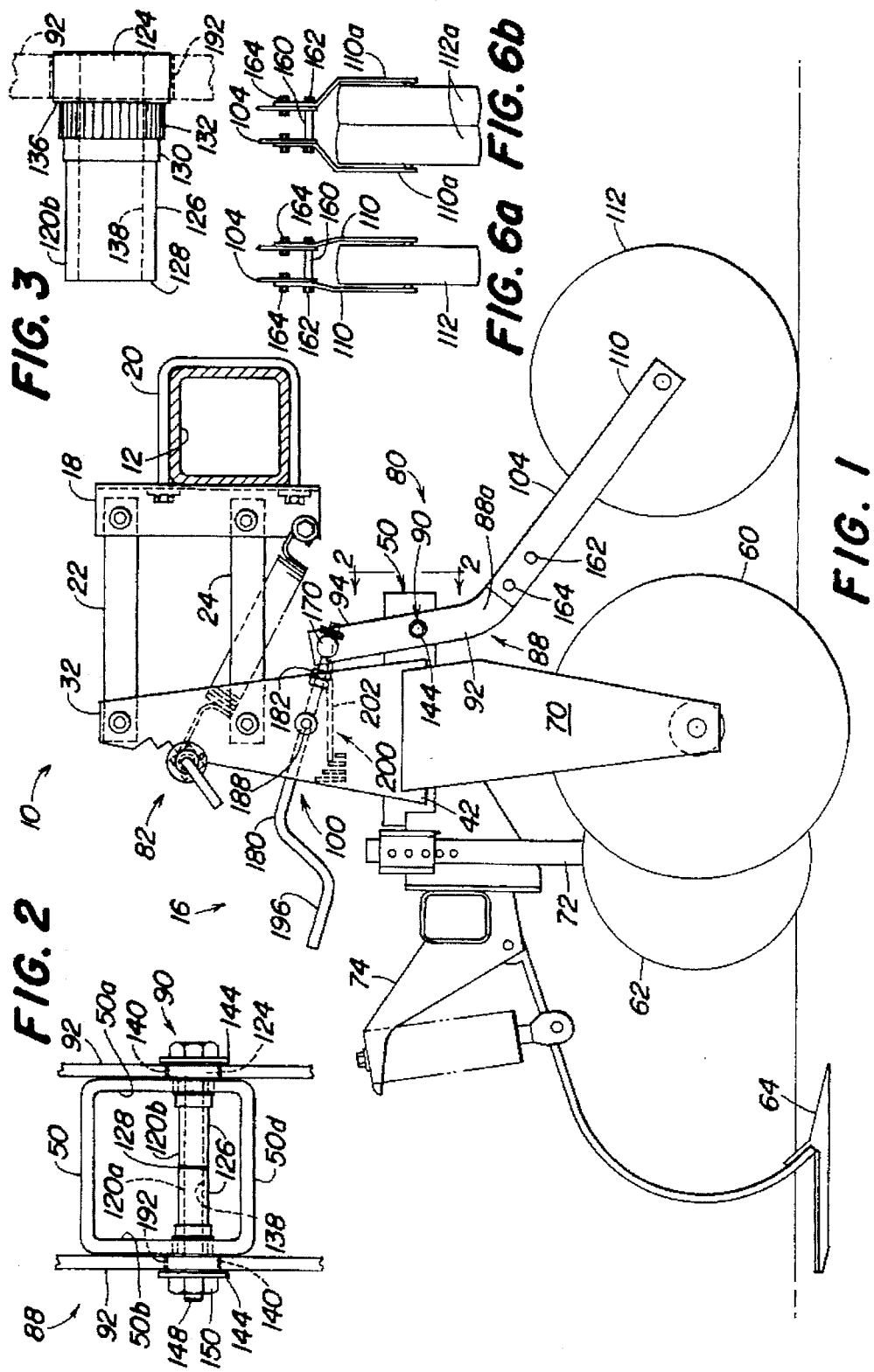

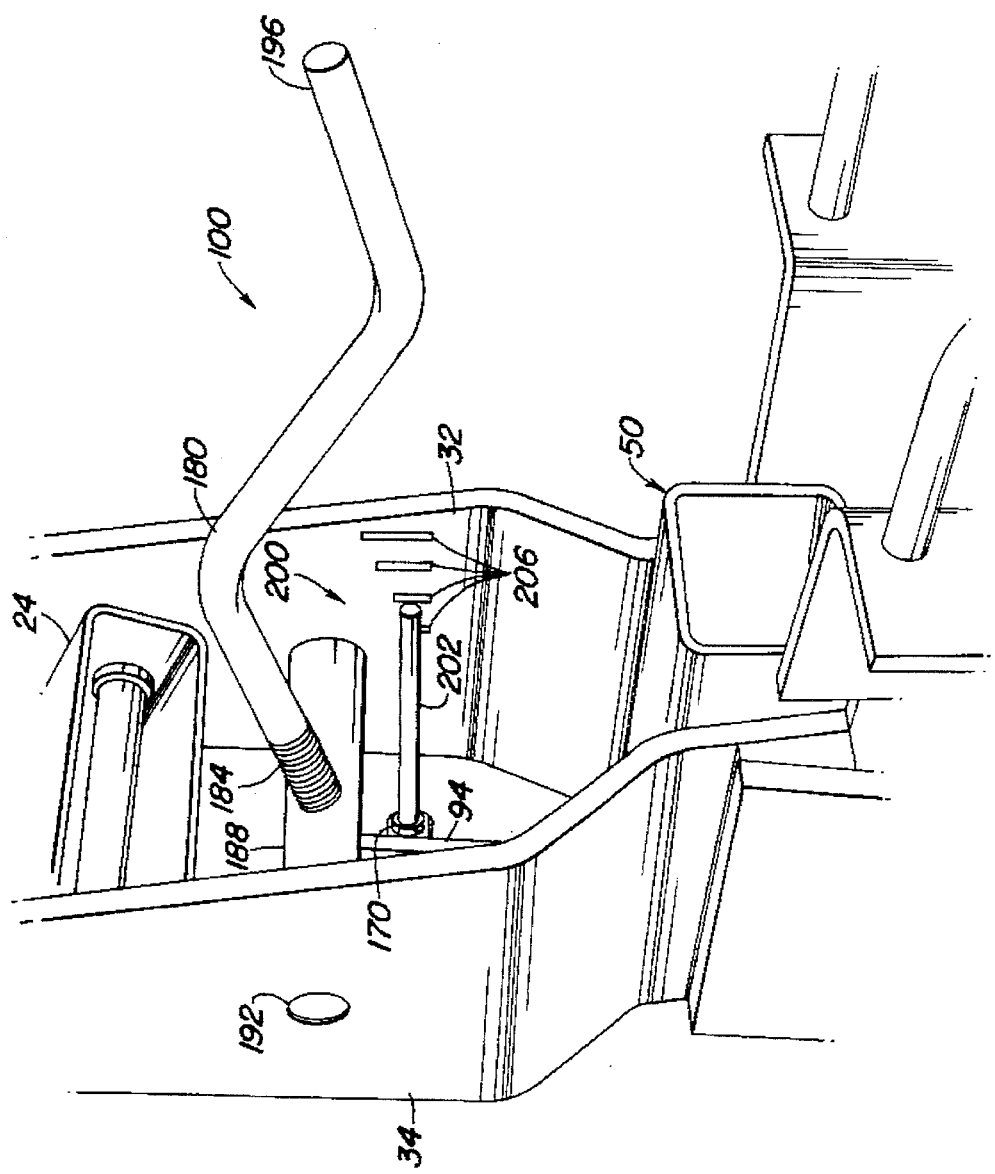

GAUGE WHEEL MOUNTING

BACKGROUND OF THE INVENTION

1. Field of the Invention

The present invention relates generally to agricultural equipment such as row crop cultivators, and, more specifically, to an adjustable gauge wheel mounting arrangement for such equipment.

2. Related Art

Implements such as row crop cultivators typically include a plurality of individual rigs transversely spaced on a tool bar. A fore-and-aft extending rig tube of rectangular cross section is supported for vertical movement by a parallel linkage connected to the tool bar, and a depth gauging wheel pivotally connected to the tube maintains the tube at a preselected distance above the ground. Various arrangements of ground engaging tools are carried on the tube for penetrating the soil to a given depth dependent upon the gauge wheel adjustment.

Several problems exist with conventional gauge wheel assemblies, including the inability to provide a simple pivot mounting which is strong enough to withstand specified torque on the pivot mounting bolt without crushing the tube. Welded pivots can be used, but welding increases the time and expense of fabrication and is aesthetically undesirable. Also, alignment of the welded pivot is often a problem, and stresses on the rig can result in premature breakage in the weld area.

A further problem with conventional gauge wheel assemblies is that many lack a simple and reliable gauge wheel adjustment which is compact and easy to access. Some gauge wheel supports include a vertical standard with a series of vertically spaced holes which can be pinned at different hole locations to the tube. Others include long screw-threaded cranks having a lower end extending below the tube to a connection with a gauge wheel arm, and an upper crank end extending above the rig. Access to the crank end may be restricted, and making necessary adjustments can be time consuming and inconvenient.

The size of the depth gauging wheel or the number of depth gauging wheels utilized per rig may vary with ground conditions or tool configuration. With many of the available gauge wheel assemblies there is no convenient way to quickly and easily change the gauge wheel arrangement. Some assemblies require entire gauge wheel arm replacement to provide for dual gauge wheels or to mount gauge wheels having a diameter which differs from that of the wheels originally supplied with the equipment.

BRIEF SUMMARY OF THE INVENTION

It is therefore an object of the present invention to provide an improved gauge wheel assembly which overcomes most or all of the aforementioned problems. It is a further object to provide such an improved gauge wheel assembly which is simple and reliable in construction and easy to adjust.

It is a further object of the present invention to provide an gauge wheel assembly having an improved pivot. It is a further object to provide such an assembly which is strong enough to withstand specified mounting bolt torque without collapse of the rig tube sidewalls. It is still another object to provide such an improved pivot mount which obviates welding and facilitates manufacture of the assembly. It is still another object to provide such a pivot mounting which provides a solid pivot on the sides of a tube and which does not require a welding step.

It is still another object of the present invention to provide an improved gauge wheel assembly which is compact and easy to access for depth adjustments. It is another object to provide such an assembly which includes structure for quickly and easily determining depth adjustment.

It is yet another object of the invention to provide an improved gauge wheel assembly wherein changing the gauge wheel size or the number of gauge wheels supported is facilitated.

A gauge wheel assembly constructed in accordance with the teachings of the present invention includes a gauge wheel arm that straddles the rig tube and is supported on the tube by two bushings inserted through holes on either side of the tube. The bushings contact each other near the center of the tube to provide a solid or hard joint which permits the pivot bolt to be tightened without crushing the sides of the tube. The bushing has protrusions that are pressed into the tubing wall during installation and thereby prevent bushing rotation. Welding steps with the resultant disadvantages are eliminated.

The gauge wheel arm is preferably fabricated from a pair of flat straps which embrace the rig tube and provide good lateral stability. Two different straps at the lower end of the wheel arm permit several different combinations of gauge wheels to be quickly and easily mounted. A depth adjusting crank is supported entirely above the rig tube for easy access, and a depth indicator projects from the crank trunnion or swivel mounting on the upper end of the wheel arm to provide an indication of depth adjustment. The depth adjusting mechanism is simple and compact and supported entirely above the tube and below the support linkage connecting the rig with the main frame or tool bar.

These and other objects, features and advantages of the present invention will become apparent to one skilled in the art upon reading the following detailed description in view of the drawings.

BRIEF DESCRIPTION OF THE DRAWINGS

FIG. 1 is a side view of a row crop cultivator including a cultivator rig supported from a transversely extending tool bar.

FIG. 2 is a view of the pivot bushing arrangement of the cultivator rig of FIG. 1, the view taken essentially along lines 2—2 of FIG. 1.

FIG. 3 is an enlarged view of one of the pivot bushings utilized with the arrangement of FIG. 2.

FIG. 4 is an enlarged side perspective view of a portion of the front of the rig of FIG. 1 and showing the gauge wheel adjustment.

FIG. 6a is a top view of the gauge wheel portion of the rig of FIG. 1 showing a single gauge wheel mounting.

FIG. 6b is a view of the gauge wheel similar to the view shown in FIG. 6a, but showing a pair of gauge wheels mounted side-by-side.

DETAILED DESCRIPTION OF THE DRAWINGS

Figure 5:
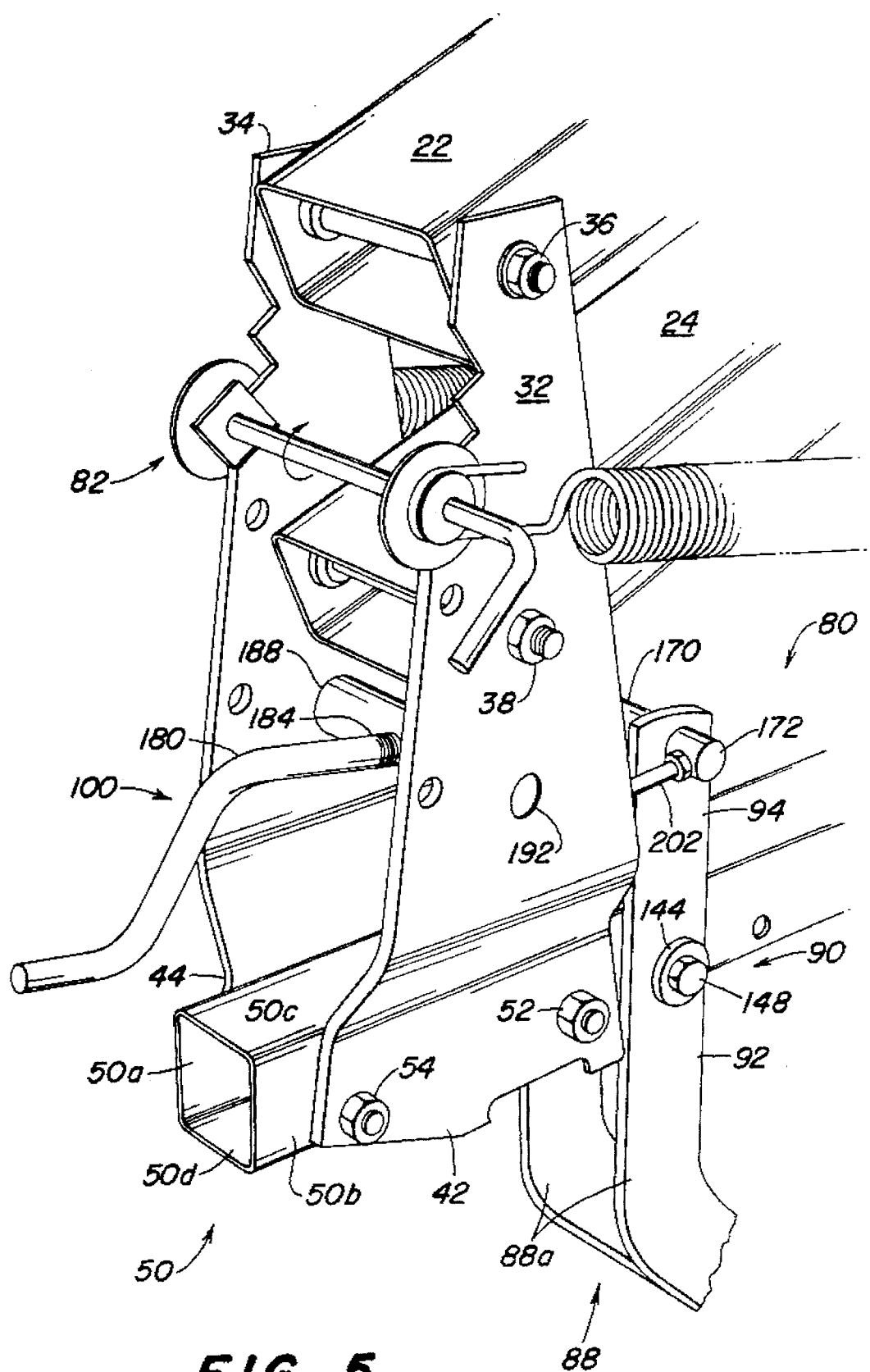
FIG. 5 is a rear side perspective view of a portion of the rig of FIG. 1.

Referring now to FIG. 1, therein is shown a portion of an agricultural implement 10 such as a row crop cultivator. A transversely extending tool bar 12 is connected to conventional hitch structure (not shown) on a tractor for forward movement over a field. A plurality of individual cultivator rigs 16 are connected by upright brackets 18 and U-bolts 20 to locations transversely spaced along the tool bar 12. A pair of fore-and-aft extending and generally parallel upper and lower arm or tubes 22 and 24 are connected at their forward ends to rearwardly extending flanges of the brackets 18. The aft ends of the arms 22 and 24 are embraced by a pair of transversely spaced, upright plates 32 and 34 pivotally connected to the arms by bushing and bolt assemblies 36 and 38. The plates 32 and 34 narrow in the upward direction and have lower apertured ends 42 and 44 which are bent towards each other and then downwardly to define a rig tube supporting area.

A fore-and-aft extending rig tube 50 is supported between the lower ends 42 and 44 of the plates 32 and 34 in substantially a horizontal attitude by connecting bolts 52 and 54 (FIG. 5). The tube 50 is rectangular in cross section with side walls 50a and 50b and top and bottom walls 50c and 50d. A plurality of earthworking tools, such as shown at 60, 62 and 64 in FIG. 1, are supported from the rig tube 50 by tool supports 70, 72 and 74 connected by suitable brackets and/or cross tubes to the tube 50. The tube 50 projects both forwardly and rearwardly from the ends 42 and 44, with the distance of the projections being variable to accommodate numerous combinations and locations of the different tools.

An adjustable straddle mounted gauge wheel system 80 is pivotally connected near the forward end of the rig tube 50 for adjusting and controlling the working depth of the tools 60–64. An adjustable down pressure spring arrangement 82, which is the subject of our copending and commonly assigned application entitled DOWN PRESSURE SPRING ADJUSTMENT and filed concurrently with the present application, is connected between the bracket 18 and the aft edges of the side plates 32 and 34 to provide down pressure control for the rig 16.

The straddle mounted gauge wheel system 80 includes a control arm 88. A bushing assembly 90 pivotally supports a bifurcated central portion 92 of the arm 88. The arm 88 includes an upper end 94 connected to an adjustable depth control arrangement 100 located above the tube 50 for selectively pivoting the arm about the axis of the bushing assembly 90. The arm 88 also includes a forwardly directed lower end 104 with removable gauge wheel supports 110 which mount one or more ground engaging gauge wheels 112 for controlling tool depth.

The bushing assembly 90 is mounted in apertures in the side walls 50a and 50b (FIG. 2) of the tube 50 at a location offset vertically toward the tube bottom wall 50d. The fore-and-aft location of the assembly 90 in the tube 50 can vary depending upon the choice tools and tool configuration of the rig. Preferably, the pivot location is chosen such that the arm 88 is located forwardly adjacent the plates 32 and 34, with the depth control arrangement at least partially supported between the plates above the tube 50 and below the lower arm 24 of the parallel linkage.

The bushing assembly 90 includes first and second identical single piece bushing members 120a and 120b which have a shape similar to that of a shotgun shell. As best seen in FIG. 3, the member 120b includes an outermost enlarged cylindrically shaped bearing surface 124 having an axial dimension slightly greater than the width of the central portion 92 of the arm 88 which is supported by the assembly 90. An elongated innermost cylindrical portion 126 having a flat inner end 128 joins a first shoulder portion 130 leading to an enlarged knurled portion 132 adjacent the bearing surface 124. The diameter of the aperture in the side wall 50a is approximately equal to the diameter of the knurled portion 132 so that projections on the portion 132 bite into the metal bordering the aperture to hold each of the members 120a and 120b in place and prevent relative rotation between the members and the side walls 50a and 50b.

The diameter of the portion 132 is less than that of the bearing surface 124 so that a shoulder 136 is defined. The bushing members 120a and 120b are driven axially into the corresponding apertures in the tube side walls 50a and 50b. The length of each of the members 120a and 120b from the end 128 to the shoulder 136 is equal to half the distance between the outside surfaces of the side walls 50a and 50b so that the flat ends 128 are in abutting relationship with the tube (FIG. 2) when the shoulders 136 abut the side walls 50a and 50b. A central bore 138 extends axially through each bushing member.

Relatively large apertures 140 in the tube-straddling central portion 92 of the arm 88 have diameters slightly larger than the diameters of the bearing surfaces 124 which rotatably mount the arm on the tube 50. Washers 144 are placed at the outer face of the bearing surface 124 and are held in position by a bolt 148 which extends through the bore 138. A nut 150 tightened on the threaded end of the bolt 148 sandwiches the washers against the bearing surface end and draws the ends 128 into face-to-face contact to thereby provide a solid or hard joint and prevent inward deformation of the side walls 50a and 50b.

As shown in the drawing figures, the arm 88 includes a pair of identical straps 88a supported in parallel relationship to each other and to the side walls 50a and 50b. The spacing between the straps 88a is approximately equal to the distance between the side walls 50a and 50b for good support on the tube 50. A spacer 160 and a bolt 162 maintain proper separation of the straps 88a at the lower end 104 of the arm 88 as well as provide support for the wheel supports 110. Additional bolts 164 extend through the straps 88a and the supports 110 to secure the supports in position.

The upper ends of the straps 88a are maintained in the proper spaced relationship by the bushing assembly 90, with the straps sandwiched between the washers 144 and the side walls 50a and 50b. The upper ends of the straps 88a are apertured and pivotally mount a swivel 170 (FIG. 5) a short distance above the tube 50. The swivel 170 includes reduced diameter ends 172 which project outwardly from the straps. One end of a crank 180 is rotatably supported and axially retained by a nut and washer assembly 182 (FIG. 1) in a bore extending through a central portion of the swivel 170. The crank 180 is threaded at 184 (FIG. 5) and received in a second swivel 188 having reduced diameter ends 192 pivotally supported in apertures in the side plates 32 and 34. A crank handle 196 projects in the fore-and-aft direction (rearwardly as shown in FIG. 1) from between the side plates 32 and 34 to an easily accessed location on the rig 16. By rotating the handle 196, an operator can change the length of the threaded portion of the crank 180 between the swivels 170 and 188 to thereby pivot the arm 88 about the axis of the bolt 148 to move the gauge wheel vertically relative to the tube.

To facilitate setting of the depth gauging of the rigs 16 and provide repeatability, a depth indicator assembly 200 is located adjacent the crank 180. A pointer rod 202 has a forward end fixed to one end 172 of the swivel 170. The opposite end of the rod 202 projects rearwardly to an end located adjacent the inner surface of the side plate 32. Lines or similar indicia 206 are located on the surface to provide an indication of the gauge wheel location relative to the tube 50. By fixing the rod 202 to the swivel 170, movement of the rod other than in the fore-and-aft direction is minimized, and a more direct indication of the angle of the arm 88 and thus the depth setting is provided.

To change the size and ground contact area of the gauge wheel 112, the straps 110 are removed by removing the bolts 162 and 164 (FIG. 6a) from the lower end of the arm 88. Replacement straps, such as shown at 110a of FIG. 6b with dual gauge wheels 112a, are bolted in position.

Having described the preferred embodiment, it will become apparent that various modifications can be made without departing from the scope of the invention as defined in the accompanying claims.

We claim:

1. In an agricultural implement with tool support tube rockably connected to an implement tool bar for movement vertically with respect thereto, the tube having upright side walls, an earth engaging tool supported from the tube and moveable therewith, a tube height control system for maintaining the tube a preselected distance above the ground, the height control system including:

a pivot bushing located in the tube;

a control arm pivotally connected to the pivot bushing for rocking about an axis, the arm having an upper end extending above the tube and a lower end extending below the tube;

a ground-contacting gauge wheel supported from the lower end of the arm;

an adjustable length assembly supported above the tube and connected to the upper end of the control arm for pivoting the control arm and moving the gauge wheel vertically relative to the tube; and wherein the tube side walls include first and second opposed apertured portions, and the bushing comprises first and second members, the first member having an outer portion with a bearing surface, a side wall engaging portion providing a friction fit in the first apertured portion, and an axially inward portion projecting towards the second apertured portion, the second member supported in the second apertured portion and projecting inwardly therefrom into contact with the first member to provide a rigid joint, and a bolt member extending through the first and second members and apertured portions, and urging the members into contact with each other, the rigid joint preventing inward deformation of the tube side walls.

2. The invention as set forth in claim 1 wherein the bearing surface is supported outwardly adjacent the first apertured portions and the control arm is pivotally supported on the bearing surface.

3. The invention as set forth in claim 2 wherein the control arm includes a bifurcated portion straddling the bushing.

4. The invention as set forth in claim 3 wherein the second member includes a second bearing surface supported outwardly of the second apertured portion and the bifurcated portion is supported on the bearing surfaces.

5. In an agricultural implement with tool support tube rockably connected to an implement tool bar by a parallel bar linkage having upper and lower arms for movement of the tube vertically with respect to the tool bar, the tube having upright side walls, an earth engaging tool supported from the tube and moveable therewith, a tube height control system for maintaining the tube a preselected distance above the ground, the height control system including:

a pivot bushing located in the tube;

a control arm pivotally connected to the pivot bushing for rocking about an axis, the arm having an upper end extending above the tube and a lower end extending below the tube;

a ground-contacting gauge wheel supported from the lower end of the arm;

an adjustable length assembly supported above the tube and below the lower arm, the assembly connected to the upper end of the control arm for pivoting the control arm and moving the gauge wheel vertically relative to the tube; and wherein the adjustable length assembly includes a fore-and-aft extending depth setting crank pivotally connected at its forward end to the upper end of the control arm and supported substantially entirely above the tube and below the lower arm.

6. The invention as set forth in claim 5 further including spaced support plates connected to and extending upwardly from the tube, and wherein the crank includes a central portion supported between the plates and a handle offset from the plates.

7. The invention as set forth in claim 5 including a swivel connected to the upper end of the control arm and to the crank, and a depth setting indicator connected to the swivel and located adjacent one of the support plates for providing an indication of the gauge wheel location relative to the tube.

8. In an agricultural implement with a fore-and-aft extending tool support tube rockably connected to an implement tool bar for movement vertically with respect thereto, the tube having upright side walls, an earth engaging tool supported from the tube and moveable therewith, a tube height control system for maintaining the tube a preselected distance above the ground, the height control system including:

a pivot bushing located in the tube at the forward end of the tube;

a control arm pivotally connected to the pivot bushing for rocking about an axis at the forward end of the tube, the arm having an upper end extending above the tube and a lower end extending below the tube and extending forwardly of the tube;

a ground-contacting gauge wheel supported from the lower end of the arm;

an adjustable length assembly supported above the tube and connected to the upper end of the control arm for pivoting the control arm and moving the gauge wheel vertically relative to the tube; and wherein the control arm comprises first and second side arm members straddling the tube, a swivel supported between the side arm members at the upper end of the control arm, wherein the adjustable length assembly is connected to the swivel.

9. In an agricultural implement with tool support tube rockably connected to an implement tool bar for movement vertically with respect thereto, the tube having upright side walls, an earth engaging tool supported from the tube and moveable therewith, a tube height control system for maintaining the tube a preselected distance above the ground, the height control system including:

a pivot bushing located in the tube;

a control arm pivotally connected to the pivot bushing for rocking about an axis, the arm having an upper end extending above the tube and a lower end extending below the tube;

a ground-contacting gauge wheel supported from the lower end of the arm;

an adjustable length assembly supported above the tube and connected to the upper end of the control arm for pivoting the control arm and moving the gauge wheel vertically relative to the tube; and wherein the pivot bushing comprises a pair of substantially identical bushing sections, each having a cylindrical outer bearing portion, a tube engaging portion with anti-rotation protrusions located adjacent the bearing portion for engaging the tube side walls, and an inner portion received within the tube between the side walls, the inner portion having an end, the inner ends of the pair of bushing sections contacting each other in a central area between the side walls for lending strength and stability to the side walls.

10. In a agricultural implement having a tool frame and adapted for forward movement over the ground, a fore-and-aft extending tool support tube rockably connected to the tool frame by a parallel bar linkage including an upright bracket connected to the linkage, the tube connected to the bracket in generally a horizontal attitude and having upright side walls, an earth engaging tool supported from the tube and moveable therewith, a height control system for maintaining the tube a preselected distance above the ground, the height control system including:

a control arm pivotally connected to the tube for rocking about an axis, the arm having a central portion straddling the tube, an upper end extending above the tube and a lower end extending below the tube;

a ground-contacting gauge wheel supported from the lower end of the control arm;

an adjustable depth control connected to the upper end of the control arm for pivoting the control arm about the axis and moving the gauge wheel vertically relative to the tube; and wherein the adjustable depth control includes a crank having a first end connected to the upper end of the control arm, a central portion pivotally connected to the upright bracket, and a crank handle offset from the bracket, and wherein the crank is supported substantially entirely above the tube and below the parallel bar linkage.

11. The invention as set forth in claim 10 wherein the upright bracket includes a pair of plates spaced on opposite sides of the tube, and further including a swivel support pivotally connected to the plates above the tube and supporting the central portion of the crank.

12. In an agricultural implement having a tool frame and adapted for forward movement over the ground, a fore-and aft extending tool support tube rockably connected to the tool frame by a parallel bar linkage including an upright bracket connected to the linkage and forward and aft linkage pivots, the tube connected to the bracket in generally a horizontal attitude and having upright side walls, an earth engaging tool supported from the tube and moveable therewith, a height control system for maintaining the tube a preselected distance above the ground, the height control system including:

a control arm pivotally connected to the tube for rocking about an axis located below the parallel bar linkage and between the forward and aft linkage pivots, the arm having a central portion straddling the tube, an upper end extending above the tube and a lower end extending below the tube;

a ground-contacting gauge wheel supported from the lower end of the control arm;

an adjustable depth control connected to the upper end of the control arm for pivoting the control arm about the axis and moving the gauge wheel vertically relative to the tube; and wherein the control arm comprises first and second generally flat arm sections supported on either side of the tube, and upper and lower spacers connected between the arm sections and retaining the arm sections in generally a parallel spaced relationship adjacent the side walls.

13. The invention as set forth in claim 12 wherein the upper spacer is pivotally connected between upper ends of the arm sections, and the depth control is connected to the spacer.

14. The invention as set forth in claim 12 wherein the lower end of the control arm includes removable spaced gauge wheel supports for supporting gauge wheels of different effective widths.

15. In a agricultural implement having a tool frame and adapted for forward movement over the ground, a fore-and-aft extending tool support tube rockably connected to the tool frame by a parallel bar linkage including an upright bracket connected to the linkage, the tube connected to the bracket in generally a horizontal attitude and having upright side walls, an earth engaging tool supported from the tube and moveable therewith, a height control system for maintaining the tube a preselected distance above the ground, the height control system including:

a control arm pivotally connected to the tube for rocking about an axis, the arm having a central portion straddling the tube, an upper end extending above the tube and a lower end extending below the tube;

a ground-contacting gauge wheel supported from the lower end of the control arm;

an adjustable depth control connected to the upper end of the control arm for pivoting the control arm about the axis and moving the gauge wheel vertically relative to the tube; and including a bushing assembly extending between the side walls of the tube, the bushing assembly having first and second axially opposed bushing sections pressed inwardly through apertures in the side walls, the bushing sections including inwardmost ends contacting each other within the tube and defining a solid pivot joint, and wherein the control arm is pivotally connected to the bushing assembly.

16. The invention as set forth in claim 15 wherein the bushing assembly defines a pair of opposed cylindrically shaped bearing surfaces closely adjacent the side walls, and the central portion of the control arm includes a pair of opposed portions with circular apertures supported on the bearing surfaces.

17. The invention as set forth in claim 16 further including a bolt extending through the bushing sections, and a pair of washers supported by the bolt and retaining the control arm on the bearing surfaces and maintaining the control arm in embracing relationship with the tool support tube for strength and lateral stability.

18. The invention as set forth in claim 15 wherein the bushing sections include side wall engaging protrusions for preventing rotation of the bearing surfaces relative to the tube.

* * * * *